July 29, 1958 — D Y. GORMAN ET AL — 2,845,605
CABLE TAKE-OUT
Filed May 6, 1954 — 2 Sheets-Sheet 1
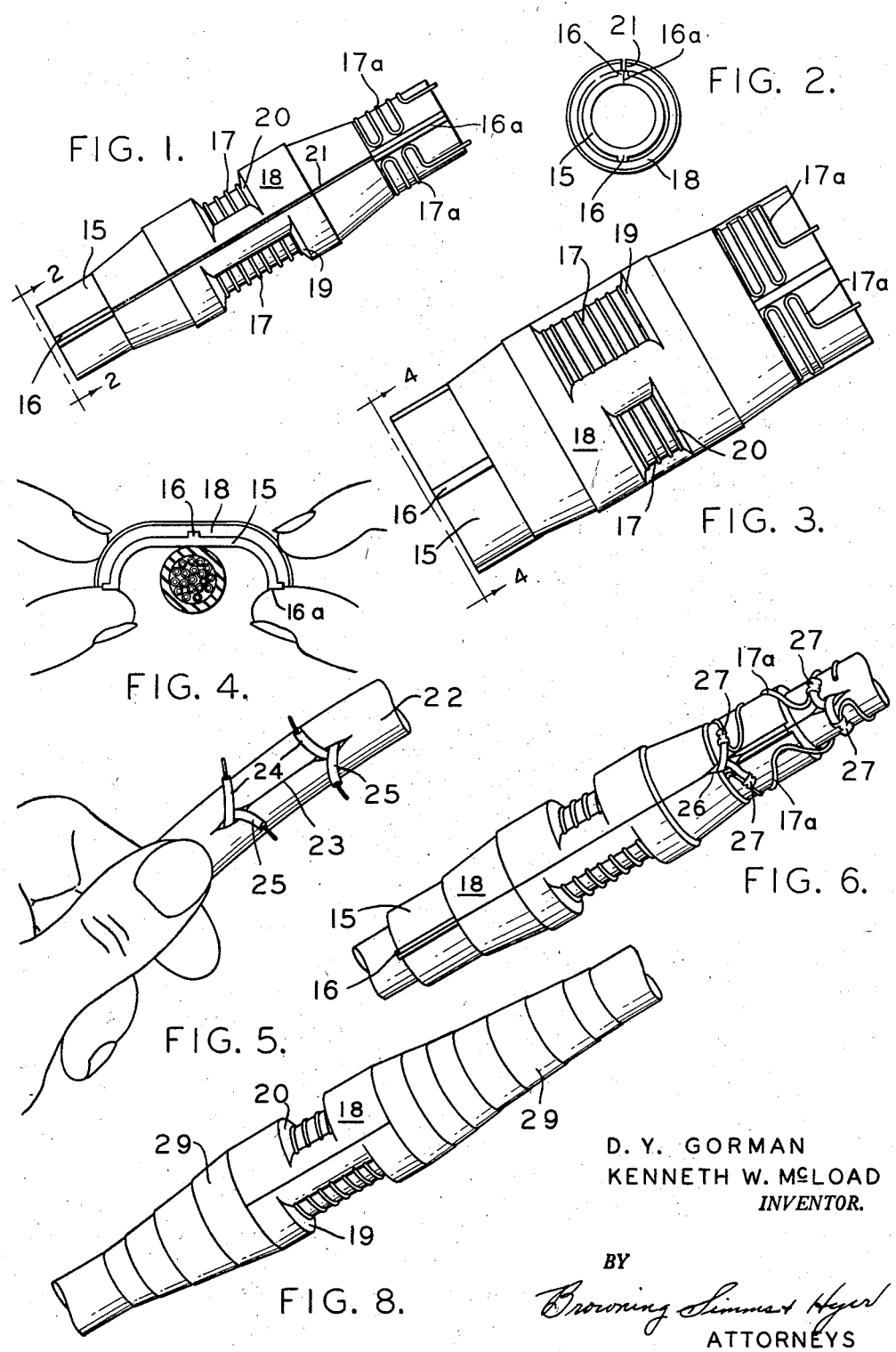
D. Y. GORMAN
KENNETH W. McLOAD
INVENTOR.
BY
ATTORNEYS July 29, 1958  D Y. GORMAN ET AL  2,845,605
CABLE TAKE-OUT
Filed May 6, 1954  2 Sheets-Sheet 2

D. Y. GORMAN
KENNETH W. McLOAD
*INVENTOR.*

BY
*Browning Simms & Hyer*
ATTORNEYS

United States Patent Office 2,845,605
Patented July 29, 1958

2,845,605

CABLE TAKE-OUT

D Y. Gorman and Kenneth W. McLoad, Houston, Tex., assignors to Vector Manufacturing Company, Houston, Tex., a partnership Application May 6, 1954, Serial No. 428,046

9 Claims. (Cl. 339—151)

This invention relates to a means for attaching branch lines to a cable intermediate its ends and more particularly to a cable take-out to which a branch line may be attached.

In seismic exploration there is employed a network of wires which are laid out on the ground and which connect the several geophones of the system to a central recording instrument. This network is usually built about a main cable provided at intervals along its length with electrical takeouts for the several pairs of wires in the cable. Leads from a geophone may be connected directly to a main cable take-out or a jumper cable may be connected to a main cable take-out and a number of geophones attached to the jumper cable by take-outs spaced along the jumper cable. Preferably, all of the take-outs of both the main and jumper cables are identical in construction and the jumper clips and geophone lead wire clips (which attach these wires and cables to take-outs) are identical to permit complete interchangeability of the jumper cables and geophones.

Due to the length of these cables, they are usually laid and retrieved from a moving vehicle utilizing handling equipment designed to take in or pay out cable at high speeds. The handling equipment may be cable handlers in the form of a pair of power driven wheels provided with pneumatic tires which run on each other and pass the cable therebetween at high speed both in throwing the cables out of the truck and in retrieving the cables. The equipment may also take the form of cable reels. Using either type of handling equipment, it is desirable to have take-outs which conform, so far as possible, to the contour of the cables to prevent their snagging on rocks, brush, etc. when the cables are being dragged over the ground or when being picked up by the handling equipment. The take-outs, particularly in the case of the wheel handlers, should also follow the contour of the cable quite closely to prevent their being crushed by the wheels of the cable handler or possibly catching in the cable handler mechanism. For instance, a pigtail take-out, which is a branch wire dangling from the cable, would be highly susceptible of being carried into the mechanism of the cable handler by the throwing wheels and being torn from the cable.

There are presently available take-outs which conform very closely to the contour of the cable and have no pigtails or extreme protrusions which would tend to snag in use or to give trouble in the handlers, but these take-outs are all applied to the cable sheathing in a factory application, as by molding the take-out about the cable. If one of the take-outs fail, the cable may be returned to the factory to have the take-out replaced, or a pigtail, which tends to give trouble both in snagging and in passing through the cable handler, may be attached to the pair of cable wires which were served by the now faulty take-out. It might be mentioned at this point that the pigtail take-out is subject to other objections than heretofore mentioned such as their tendency to fatigue and break in use, and no attempt is here being made to set out all of the objectional features of a pigtail take-out.

It would be advantageous to have a take-out which closely conforms to the cable and which may be attached to the cable in the field without special tools, molds, etc. as a replacement for a defective take-out or as a means of attaching additional geophones to the cable, and it is an object of this invention to provide such a take-out.

Another object is to provide a take-out of the type described which may be mechanically attached to a cable without special tools and which may be laid and retrieved with the usual reel, or wheel handling equipment, with substantially the same facility as a molded take-out.

Another object is to provide a take-out of the type described which may be mechanically attached to a cable between pre-existing take-outs without special tools.

Another object is to provide a take-out of the type described which may be mechanically attached to a cable between pre-existing take-outs without special tools, and to which may be interchangeably connected the take-out clips designed for the factory molded take-outs on the cable.

Another object is to provide a take-out of the type described which may be mechanically attached to a cable between pre-existing take-outs without special tools in which the take-out terminals are polarized to prevent the reverse connection of a clip.

Another object is to provide a take-out of the type described which is rugged and durable and will withstand normal cable handling almost as well as a factory molded take-out.

Other objects, features and advantages of this invention will appear from a perusal of the written specification, the appended claims, and the attached drawings.

In the drawings wherein there is shown by way of illustration one embodiment of this invention and wherein like reference numerals indicate like parts:

Fig. 1 is a view in side elevation of a take-out constructed in accordance with this invention;

Fig. 2 is a view along the lines 2—2 of Fig. 1;

Fig. 3 is a view in side elevation of the take-out of Fig. 1 with the take-out spread apart to permit the take-out to be placed about a cable;

Fig. 4 is an end view of the cable take-out taken along the lines 4—4 of Fig. 3 and showing the take-out being placed about a cable;

Fig. 5 is a view in elevation of a geophone cable which has been slit and a pair of wires lifted out, parted, and skinned preparatory to attaching a take-out to the cable;

Fig. 6 is a pictorial view of the cable take-out of Fig. 1 in position about a cable with the terminals of the take-out crimped to a pair of wires lifted out of the cable;

Fig. 8 is a pictorial view of the completely assembled cable take-out;

Figure 9:
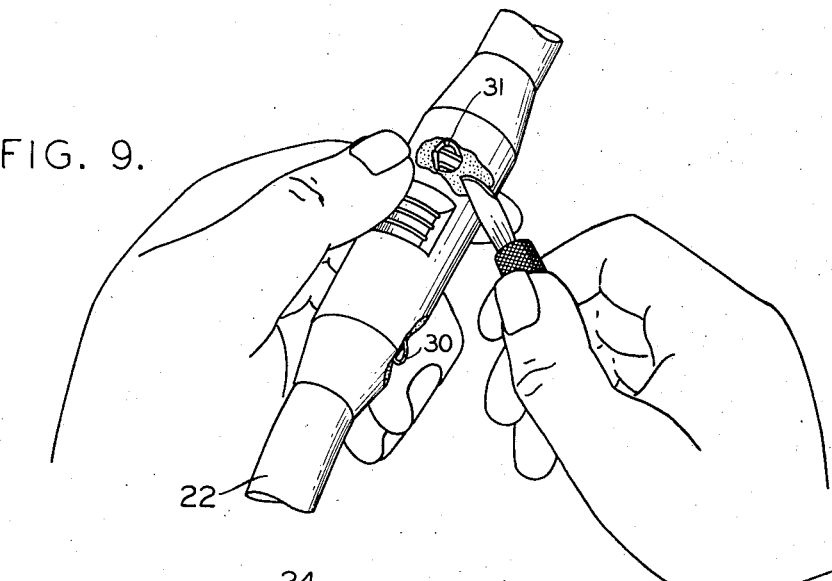
Fig. 9 is a pictorial view of a faulty take-out which was molded to the cable at the factory with sections of the body of the take-out being cut away to locate and lift out the loops of the pair of wires of the cable to which the terminals of the take-out were attached.
Figure 10:
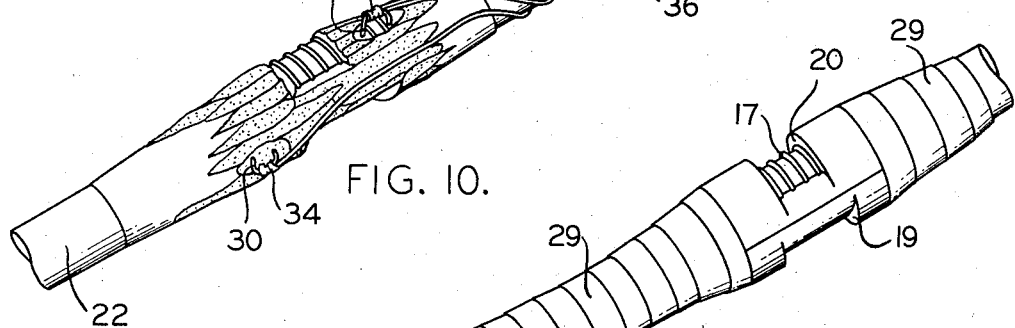
Figure 11:
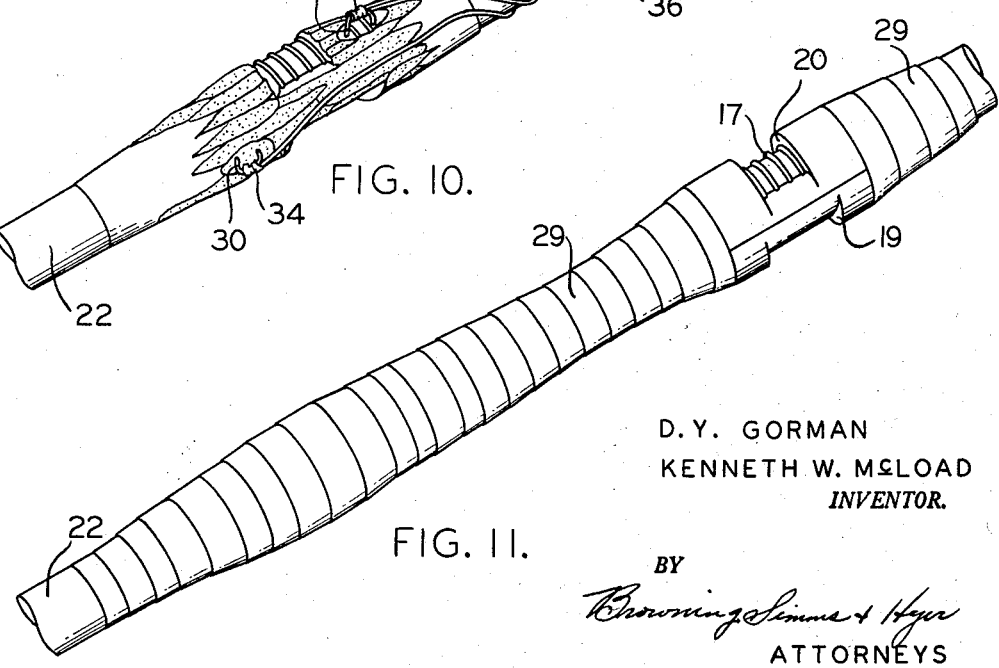

Fig. 10 is a pictorial view of a section of cable showing the excess bulk of the take-out of Fig. 9 to be cut away, a take-out constructed in accordance with this invention about the cable adjacent the take-out, and pigtails leading from the repair take-out to the lifted out loops; and Fig. 11 is a pictorial view of the section of cable shown in Fig. 10 after the assembly of the repair take-out has been completed.

The electrical take-out of this invention includes a tubular body which is slit longitudinally to permit the insertion of a cable through the slit into the bore of the body. One or more terminals are embedded in the body. Each terminal is provided with a portion for attachment to a wire of the cable and additionally with a portion for contact with a contact such as the contact of a clip on a jumper cable or geophone lead wires.

The base 15 of the body is an elongate, tubular member of flexible material such as synthetic rubber or plastic and extends the length of the take-out. A pair of ribs 16 project outwardly from base 15 and extend lengthwise of the body. Ribs 16 are spaced at diametrically opposed points on the exterior of the body and position the terminals as will appear below. The base of the body and the positioning ribs may be integral with each other and preferably are formed by molding the base about a mandrel. The inner diameter of the bore through the tubular base 15 should be the same as the outer diameter of the cable with which the take-out is designed to be used. Geophone cables, of course, will vary in size and the inner diameter of base 15 will correspondingly vary to accommodate different cables. The wall thickness of base 15 is generally comparable to the thickness of the sheathing of the cable with which it is designed to be used, but in forming a take-out for use with a small diameter cable, it may be desirable to form the wall of base 15 of a somewhat thicker layer of material so that the outer diameter of the take-outs will be more or less uniform in size.

In the form of take-out illustrated, there are provided two terminals 17 which are embedded in the body and are insulated from each other to provide a double contact. The terminals are formed of spring-like loops of wire to permit complete flexibility of the take-out. Preferably, the terminals should be characterized by an ability to expand or contract as well as bend along the length dimension of the terminals as this will permit the terminals to conform to the contour of the cable at all times. Such a terminal may conveniently be fabricated by bending a length of wire in a series of continuous S-turns. The loops of the S are additionally bent laterally about an arc of slightly less than 180° to form an elongate, winding terminal which will snugly embrace a portion of the periphery of base 15. This shape may be referred to as "split spring" as it resembles a half of a helical wound spring. A pair of such terminals are positioned snugly against the outer periphery of the base 15 and spaced apart by ribs 16. If it is desired to employ a single terminal having two contacts at circumferentially spaced points, the ribs 16 may be omitted and a pair of split spring terminals 17 secured together along one adjacent edge by tying adjacent loops of the split springs together with several wraps of wire. These wraps of wire will act as hinges when the take-out is spread apart as shown in Fig. 4. The loops of the S-turns of split spring 17 might also be bent about an arc of slightly less than 360° to form a single terminal and the elasticity of the terminal depended upon to permit the take-out to be spread apart when it is being positioned about a cable as is well known to those skilled in the art. Polarization may be maintained with this type of take-out either by color coating or by dimensioning the take-out windows of each group of take-outs to have different widths.

An outer boot 18 of flexible material such as synthetic rubber or plastic is then molded about the base and the terminals, and holds the terminals in place. The mold in which boot 18 is applied is preferably provided with one or more lands to provide contact windows overlying an intermediate portion of terminal 17. Where a double contact is employed circumferentially spaced lands of different widths provide windows 19 and 20 of different widths in the boot. With this arrangement, geophone or jumper clips of the snap-on or clothespin type having jaws correspondingly dimensioned will only fit about the take-out with the jaws overlying the proper windows and the polarization of the network will be automatically maintained. Such lands will usually have plane faces and form windows 19 and 20 with a slight layer of material overlying the terminals. A wire brush may then be used to clean the material from the terminals and expose the same for contact by the terminals of a geophone or jumper clip. Preferably, the mold in which boot 18 is applied is also provided with a land running lengthwise of the mold and between the lands which form windows 19 and 20. In positioning base 15 in the mold preparatory to forming boot 18, this lengthwise land should overlie one of ribs 16 in a manner to form groove 21 in boot 18. The purpose of this groove will appear below.

An additional portion of each terminal 17 should be exposed for purposes of connecting the terminal to one of the wires of the cable with which the take-out is to be used. Preferably, this is accomplished by molding boot 18 about one end of the terminals 17 embedding the major portion of the terminals, but leaving the ends 17a of the terminals exposed or projecting from one end of boot 18. This construction will permit the coils of wire which make up the ends 17a of the terminals to be expanded endwise and easily connected with wires lifted from the cable.

After boot 18 has been applied, the take-out is slit at 16a lengthwise through rib 16 which underlies gap 21 in the molded boot. This slit extends from end to end of the take-out body and permits the take-out to be spread apart and a cable to be inserted into the bore of the take-out through the slit as indicated in Fig. 4.

Referring now to Figs. 5 through 8, there is shown the manner of assembling the take-out upon a cable when it is desired to provide an additional take-out on the cable. The cable 22 to which the take-out is to be applied is slit at 23 for approximately two inches and the proper pair of wires 24 and 25 for the take-out located and lifted out of the cable sheathing. To prevent undue strain on wires 24 and 25, they are preferably cut in two, and the two ends connected to the take-out terminals. As shown in Fig. 5, the two wires are cut in two at approximately the middle of slit 23 and the ends of wires 24 and 25 are stripped of insulation preparatory to securing them to terminals 17.

Slit 23 is now heat welded or sealed with cement. Where cement is used, the cement will vary according to the material of the sheathing. For instance, with a plastic sheathing of polyvinyl chloride, a vinyl cement would be used taking care not to get any cement on the conductors inside of the cable jacket. The cable is then coated with an appropriate cement in the area over which the molded take-out is to be received to provide a strong mechanical bond between the cable and take-out.

The take-out is placed about the cable by inserting the cable through slit 16a, as illustrated in Fig. 4, and positioning the take-out over a portion of slit 23 in the cable, as illustrated in Fig. 6, and overlying the coating of cement so that the cement will bond the take-out to the cable sheathing. A small notch 26 is cut in the wall of the take-out at slit 16a to permit one of the cut ends of wire 24 and one of the cut ends of wire 25 to pass through the slit 16a. Portions 17a of terminals 17 are pulled out far enough to make connections with the other cut ends of wires 24 and 25 which lie beyond the take-out. Crimp connectors 27 are utilized to secure the cut ends of wire 24 to one of terminals 17 and to secure the cut ends of wire 25 to the other of terminals 17.

Figure 7:
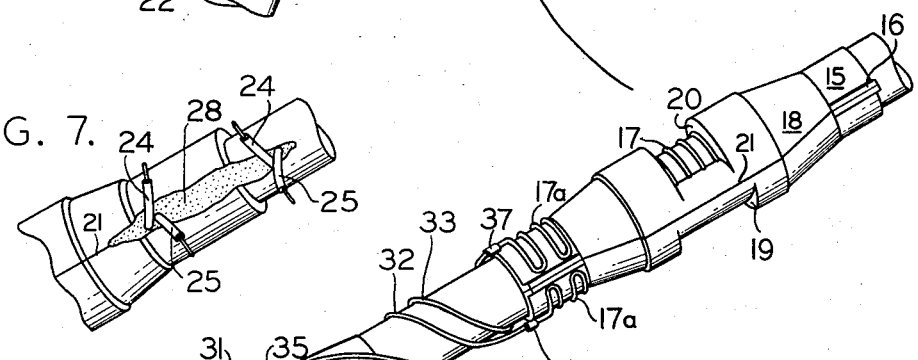
Fig. 7 is a fragmentary pictorial view of the take-out illustrating the use of plastic putty overlying the slit in the cable to seal the slit.

The take-out slit 16a should be heat welded or sealed with cement and the boot section of the take-out bound with strings so as to exert a uniform pressure throughout the entire length of the boot. This string should be allowed to remain until the cement with which the sheathing was coated has set up and the take-out is firmly secured to the cable. The exposed portion of slit 23 in cable 22 and the slit 16a of base 15 from notch 26 extending outwardly to the end of the base may then be filled with a non-hardening sealing putty 28, as illustrated in Fig. 7.

The take-out is then wrapped with several layers of tape 29 to further bind the take-out in place and to provide a sealing, insulating body of material which will prevent the entry of moisture and which will insulate portions 17a of the terminals and their connections with wires 24 and 25. Preferably, this tape 29 is applied in three layers with the innermost layer being a vinyl tape to insulate, protect against moisture, and to mechanically bind the take-out to the cable and hold the connections between the terminals and cable wires firmly in place. The intermediate layer is preferably a self-bonding, electrical insulating, synthetic tape which provides electrical insulation and seals against moisture. The outer layer may be of any desired type which will protect the intermediate layer and assist in providing a mechanical connection between the take-out and the cable. The resulting take-out is illustrated in Fig. 8, and is one which closely conforms to the contour of the cable and will not give trouble in the handling equipment or in undue snagging of brush, rocks, etc.

In Figs. 9 through 11 there is illustrated the manner of using the take-out of this invention as a means of repairing a defective take-out. As shown in Fig. 9, the cable wires which are attached to a molded take-out in the factory are usually provided with loops 30 and 31 which may be lifted through the cable sheathing and attached to the terminals. When a take-out becomes faulty, the first step in attaching a take-out constructed in accordance with this invention is to carefully cut away the boot of the molded take-out to expose loops 30 and 31. A repair take-out is then positioned adjacent the defective take-out and cemented in place in the same manner as explained hereinabove. A pair of pigtails 32 and 33 are secured to loops 30 and 31, respectively, by connectors 34 and 35. The pigtails are then wrapped around the cable until they reach the repair take-out and the pigtails are attached to the exposed ends 17a of the split spring terminals by connectors 36 and 37. As it has not been necessary to slit the sheathing of cable 22, the putty 28 will not usually be applied.

The repair take-out is then wrapped with several layers of tape in the same manner as before with the wraps of tape extended to cover the pigtails 32 and 33 and the defective take-out to protect and insulate the connections at the defective take-out.

From the foregoing, it will be seen that there has been provided a take-out which conforms very closely to the contour of a cable and which does not have loose ends for pigtails which might give trouble either in snagging or in hanging up in the throwing and retrieving equipment frequently used with geophone cables. The take-out may be applied at any point along an existing cable to give an additional take-out point or may be used as a repair unit to replace a defective take-out.

The take-out is attached to the cable by mechanical means and may be readily applied in the field, thus overcoming the necessity of returning the cable to the factory for a satisfactory repair job. While the disclosure of this invention has been directed to field assembly and repair, it will be understood that the take-out might also be applied in the factory if desired.

The take-out also conforms in general configuration to the factory molded take-outs and clips with polarizing jaws may be used interchangeably with the factory molded take-out (of which the Fig. 9 take-out is exemplary) or with the take-out of this invention.

While the foregoing description has been particularly directed to a double contact take-out, it will be understood that the invention is not so limited, except where so specified in the claims, it only being necessary to the practice of the invention that the terminal or terminals permit the take-out to be slit along its length and spread apart wide enough to receive the cable for which it is designed as a repair or a replacement.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An electrical take-out for a cable comprising, a tubular body of flexible insulating material slit lengthwise to permit a cable to be inserted into the bore of the body through the slit, and a terminal embedded in the body with a portion accessible for connection with a wire of a cable within the bore of the body and another portion extending circumferentially of the body exposed for engagement with an electrical contact.

2. An electrical take-out for a cable comprising, a tubular body of flexible insulating material slit lengthwise to permit a cable to be inserted into the bore of the body through the slit, and a pair of spaced terminals embedded in the body each having a portion accessible for connection with one of the wires of a cable within the bore of the body, said terminals also having intermediate portions exposed for engagement by electrical contacts.

3. The take-out of claim 2 wherein the terminals are flexible, expansible, contractible, arcuate terminals extending over less than a semicircle and spaced circumferentially of the body and opposed to each other.

4. An electrical take-out for a cable comprising, a tubular body of flexible insulating material slit lengthwise to permit a cable to be inserted into the bore of the body through the slit, a pair of circumferentially spaced terminals embedded in the body each having a portion accessible for connection with one of the wires of a cable within the body, and oppositely disposed polarizing windows in the body exposing a portion of each terminal for mechanical and electrical contact by the jaws of a snap-on clip.

5. An electrical take-out for a cable comprising, a tubular body of flexible insulating material slit lengthwise to permit a cable to be inserted into the bore of the body through the slit, a pair of elongate split spring terminals with a portion of their length embedded in the body and circumferentially spaced from each other, the unembedded portion of the terminals adapted to be connected with the wires of a cable in the bore of the body, and oppositely disposed polarizing windows in the body exposing a surface of the embedded portion of each terminal for mechanical and electrical contact by the jaws of a snap-on clip.

6. In combination with a geophone cable or the like, a cable take-out comprising, a tubular body of flexible insulating material surrounding a portion of the cable, said body slit lengthwise to permit the cable to be inserted into the bore of the body through the slit, a terminal in the body having a portion accessible for connection with a wire of the cable and a portion extending circumferentially of the body exposed for engagement with an electrical contact.

7. In combination with a geophone cable or the like, a cable take-out comprising, a tubular body of flexible insulating material surrounding a portion of the cable, said body slit lengthwise to permit the cable to be inserted into the bore of the body through the slit, a pair of spaced terminals embedded in the body each having a portion accessible for connection with one of the wires of the cable, said terminals also having intermediate portions exposed for engagement with electrical contacts, and means for securing the take-out to the cable.

8. In combination with a geophone cable or the like, a cable take-out comprising, a tubular body of flexible insulating material surrounding a portion of the cable, said body slit lengthwise to permit the cable to be inserted into the bore of the body through the slit, and a pair of spaced terminals embedded in the body each having a portion accessible for connection with one of the wires of the cable, said terminals also having intermediate portions exposed for engagement with electrical contacts.

9. An electrical take-out for a cable comprising, a tubular body of flexible material slit lengthwise to permit a cable to be inserted into the bore of the body through the slit, a terminal embedded in the body and having a portion accessible for connection with one of the wires of a cable within the bore of the body, and a window in the body exposing a portion of the terminal for mechanical and electrical contact by the jaw of a snap-on type clip.

References Cited in the file of this patent

UNITED STATES PATENTS

| | | |
|---|---|---|
| 1,708,165 | Willat | Apr. 9, 1929 |
| 1,980,197 | Gray | Nov. 13, 1934 |
| 2,054,465 | Ovellet | Sept. 15, 1936 |
| 2,229,849 | Heidebrecht | Jan. 28, 1941 |
| 2,267,630 | Wiland | Dec. 23, 1941 |
| 2,269,135 | Tate | Jan. 6, 1942 |